June 11, 1946. R. L. WILCOX 2,401,805
GUIDE FOR KNOCK-OUT PINS IN HEADERS OR THE LIKE
Filed Aug. 3, 1944 2 Sheets-Sheet 1
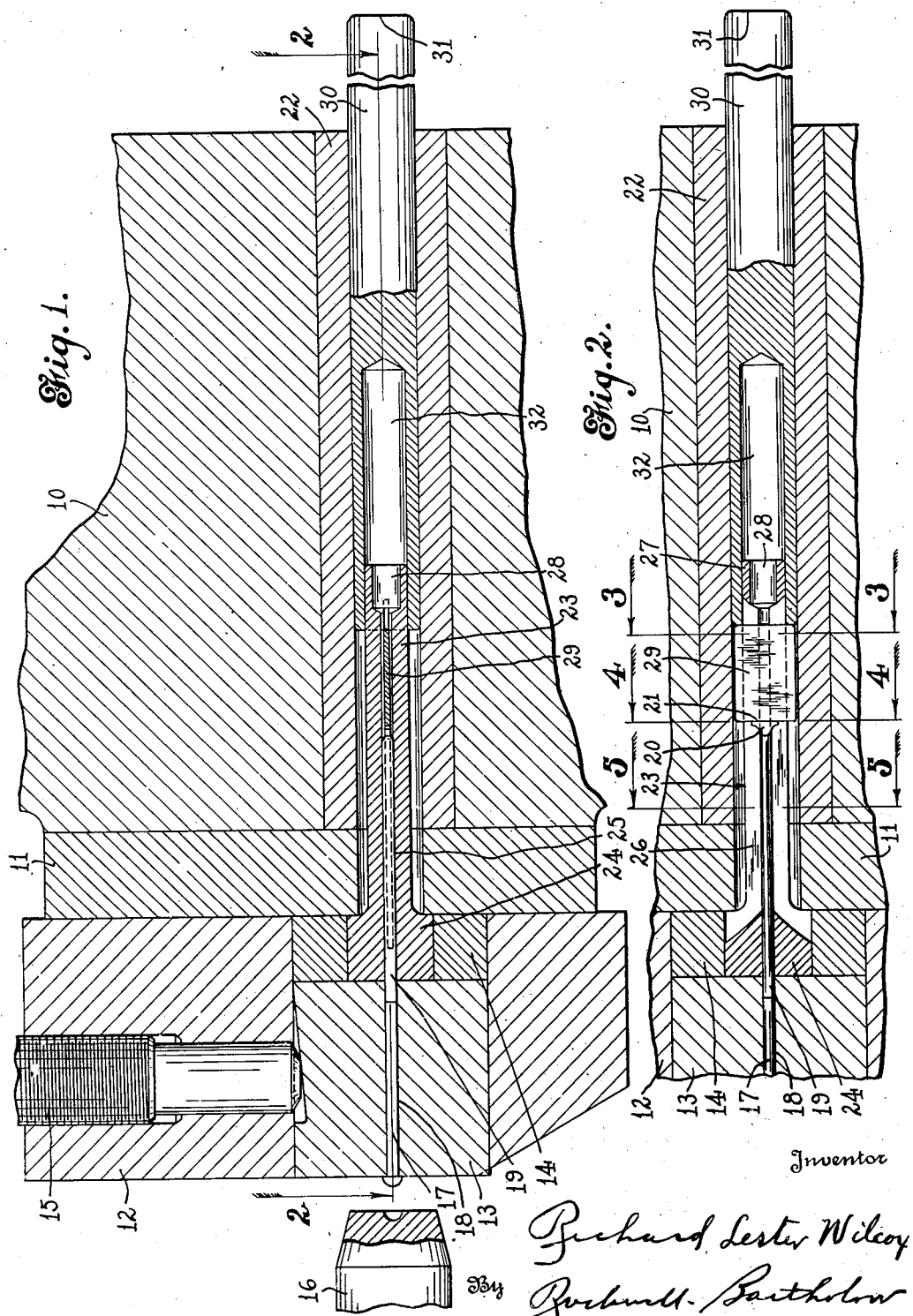
Inventor
Richard Lester Wilcox
By Bucknell Bartholow
Attorneys June 11, 1946. R. L. WILCOX 2,401,805
GUIDE FOR KNOCK-OUT PINS IN HEADERS OR THE LIKE
Filed Aug. 3, 1944 2 Sheets-Sheet 2

Inventor
Richard Lester Wilcox
By Rockwell-Laukhter
Attorneys

Patented June 11, 1946

2,401,805

UNITED STATES PATENT OFFICE 2,401,805

GUIDE FOR KNOCKOUT PINS IN HEADERS OR THE LIKE

Richard Lester Wilcox, Waterbury, Conn., assignor to The Waterbury Farrel Foundry & Machine Company, Waterbury, Conn., a corporation of Connecticut Application August 3, 1944, Serial No. 547,914

14 Claims. (Cl. 10—11)

This invention relates to headers, and more particularly to guiding mechanism for the knockout or ejecting pin employed to eject the finished or headed work from the heading die. Heretofore the length of the workpiece which could be processed has been limited by its diameter, due to the fact that the knockout pin, which is of the same diameter as the work, is unguided or unsupported for a portion of its length equal to the length of the work, and, therefore, if the length of the workpiece exceeded approximately eight times its diameter the unsupported portion of the pin would bend or break under the effort of ejecting the work from the die.

The present invention provides knock-out or ejecting mechanism wherein the knock-out pin is supported for its full length. In addition, this pin is actuated by a blade or driver, which in turn is guided over its full length, arrangements being made for actuating or effecting movement of the driver by a knock-out rod which engages the driver externally of the guiding member by which the blade and knock-out pin are guided, and within which they move.

This guiding member or sleeve is so constructed that the blade or driver is always contained therein, that is, it is not permitted to project from the guide member at either end, but only laterally therefrom, so that no part of the length of the driver or blade is unsupported during its movement. With such an arrangement there will be practically no limit to the length of the blank or workpiece which may be employed, as it will always be possible to eject the workpiece from the die due to the full support or guide for the knock-out pin.

One object of the present invention is to provide new and improved ejecting mechanism for ejecting the workpieces from headers or like machines.

A still further object of the invention is to provide a novel form of guiding means for knockout pins for use with headers and the like.

Still another object of the invention is to provide new and improved guiding means for knockout pins for headers and the like, such that the knock-out pin will be guided throughout its entire length and no portion thereof will be left unsupported.

Still another object of the invention is to provide a new and improved means for driving or actuating an ejecting or knock-out pin for use with headers or the like, wherein the knock-out pin is guided throughout its entire length, and wherein the pin is actuated by a driving member or blade which is also guided throughout its entire length.

To these and other ends the invention consists in the novel features and combinations of parts to be hereinafter described and claimed.

In the accompanying drawings:

Fig. 1 is a vertical sectional view through a portion of a header embodying my invention;

Fig. 2 is a transverse sectional view of the mechanism shown in Fig. 1, on line 2—2;

Figure 3:
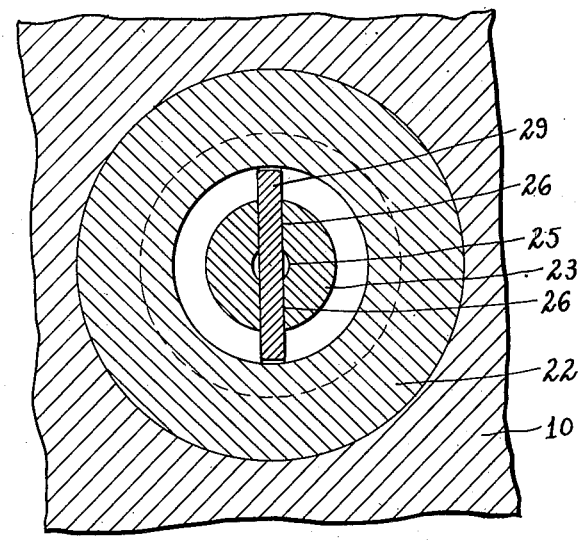
Figure 4:
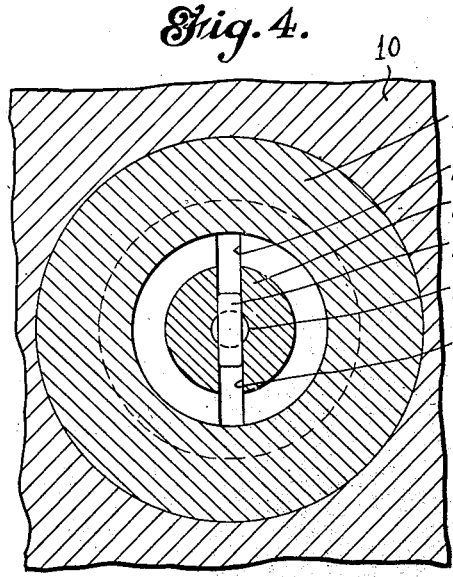
Figure 5:
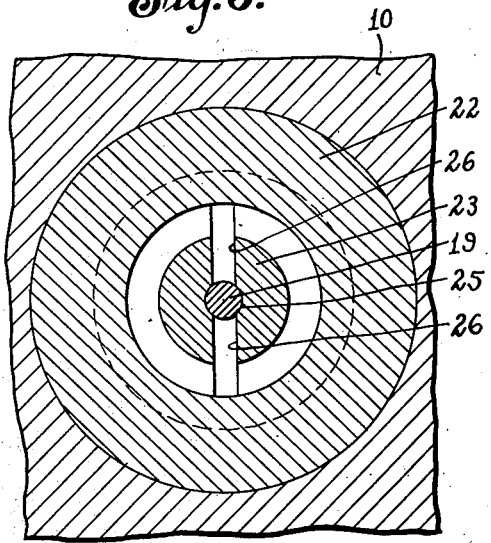
Figure 6:
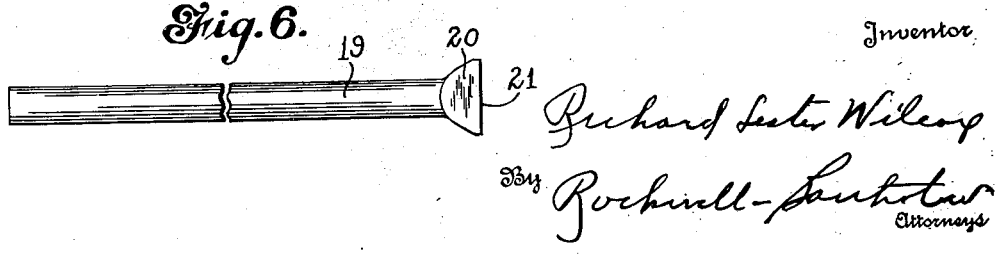

Figs. 3, 4 and 5 are sectional views taken respectively on lines 3—3, 4—4 and 5—5 of Fig. 2; and Fig. 6 is a detail elevational view of the knockout pin.

To illustrate a preferred embodiment of my invention, I have shown in Fig. 1 of the drawings a header mechanism comprising a frame 10 against which is mounted a backing plate 11 for the die block 12, the latter having a die opening within which is mounted a die 13 supported by a backing plug 14. The die may be held in place in any approved manner, such as by means of the set screw 15.

The heading punch is shown at 16, and it will be understood that a workpiece or blank 17 may be fed to the punch by any suitable mechanism, and driven thereby into the die opening 18, where it will be headed by the punch in the usual manner.

During the heading operation the workpiece 17 is held at its rear end by the knock-out pin 19, shown in Fig. 6. This knock-out pin will normally be of the same diameter as the workpiece throughout the greater part of its length, so that it may enter the die opening and move therethrough in the ejecting process. In this instance, however, the knock-out pin 19 is provided upon its rear end with a flattened head 20, shown more especially in Figs. 4 and 6, this head not only having flat sides, but also having a flat base or rear end 21 for engagement with a blade or driver, as will be hereinafter more fully described.

Within the header frame 10 is a bushing 22 provided with a longitudinal opening within which is mounted an improved guide member for the pin 19. This member comprises a body portion 23 of somewhat smaller diameter than the opening in the bushing 22, for a purpose which will presently appear, and at its upper end is provided with an enlarged head 24 mounted within the die backing plug 14 and held between the die 13 and the backing plate 11, so that the body of the guide member is supported in the bore or longitudinal passage of the bushing 22 free of the wall thereof, so as to leave an annular space between the body of the guide member and the inner wall of the bushing.

The guide member 23 is provided with a longitudinal bore or passage 25 extending therethrough, within which is snugly received the knock-out pin 19. It is also provided with longitudinal slots 26 which extend from this bore outwardly through the walls of the guide member, which slots form a narrow passage entirely through the guide member except at its ends, where these slots are discontinued so that the guide member will not be cut entirely in two. At the front end of the guide member these slots extend substantially to the base of the head 24, as shown in Fig. 2, and, as also shown in this figure, at the rear end of the guide member the slots are discontinued short of this rear end so as to leave web portions 27.

The guide member 23 is also provided at its rear end with an enlarged opening or recess 28, which extends inwardly a short distance to meet the bore 25 and the slots 26. The diameter of the recess 28 will be substantially equal to the head 20 on the knock-out pin 19, so that the knock-out pin may be inserted into the guide member from the rear end thereof, and it will be understood that when in place the flat head 20 of the knock-out pin will extend outwardly into the slots 26, the head being of the same thickness as the width of these slots, while the body of the pin will lie snugly within the bore 25.

Slidably mounted within the slots 26, which in effect constitute one slot entirely through the guide member, is a driver or blade 29 substantially rectangular in shape. The thickness of this blade is substantially equal to the width of the slots 26, so that it will be guided in its movement by these slots, and the width of the blade is substantially equal to the passage in the bushing 22, so that, at its side edges, it will extend beyond the outer wall of the guide member and into the space between the guide member and the inner surface of the bushing. These projecting edges of the blade member serve to provide at the rear end thereof engaging surfaces whereby the driver may be engaged by the knock-out rod, to be described, and actuated to drive the knock-out pin in its ejecting movement.

A knock-out rod is shown at 30, this rod being slidably mounted in the bushing 22, and it will be understood that it may be actuated at its rear end 31 by any suitable mechanism ordinarily provided for this purpose. A relatively deep recess or opening 32 is formed adjacent the forward end of the knock-out rod and opens through this end thereof, this opening being of substantially the same diameter as the outside diameter of the body portion 23 of the guide member, so that in the reciprocating movements of the knock-out rod it will telescope upon the body of the guide member, and its forward annular surface engage the laterally projecting rear edges of the driver blade 29 to move it in a forward direction.

It will be understood that the depth of the opening 32 in the knock-out rod 30 will be slightly in excess of the length of the workpiece or blank 17, so that the stroke of the knock-out rod may be sufficiently long to completely eject the work from the die. Likewise, the length of the knock-out pin 19 will be suitably proportioned for proper ejecting movement.

In the operation of the device, it will be understood that after the head has been formed on the workpiece 17, the knock-out rod 30 is advanced by the usual means provided for that purpose, and the front end of this rod bearing against the laterally projecting rear edges of the driver blade moves the latter forwardly in the guide slots 26 in the body 23 of the guide member, and the blade or driver 29 bearing against the flat head 20 of the knock-out pin advances the latter within the guide opening 25 of the member 23 to completely eject the workpiece. During this movement it will be seen that the knock-out pin is completely guided throughout its entire length by the bore 25, and also to some extent by the slots 26 in which the head 20 of the pin is received, and that the driver or blade 29 is also guided throughout its entire length, as this blade is never permitted to project from the rear end of the guide member 23, this being prevented by the web portions 27. With all of the parts thus guided throughout their lengths, there will be practically no limit to the length of the blank which may be headed.

In the usual operation of the machine, after one workpiece has been ejected from the die 13 the next succeeding blank will be brought into alignment with the punch 16 and the opening in the die, and the punch 16 will advance, pushing the blank into the die opening and forcing it to its set position for the desired length of the finished work, moving rearwardly the knock-out pin 19, the blade or driver 29, and the knock-out rod 30 until the latter brings up against the stop usually provided for this purpose. With this arrangement workpieces can now be headed in a solid die and successfully ejected without breaking the knock-out pin, which workpieces may greatly exceed in length those which may be processed by conventional methods.

While I have shown and described a preferred embodiment of my invention, it will be understood that it is not to be limited to all of the details shown, but is capable of modification and variation within the spirit of the invention and within the scope of the claims.

What I claim is:

1. Knock-out mechanism for a headed workpiece comprising a knock-out pin, a guide member in which said pin is slidably mounted, a driver for said pin also movably mounted in the guide member, and said driver projecting laterally from the guide member for engagement by a knock-out rod or the like.

2. Knock-out mechanism for a headed workpiece comprising a knock-out pin, a guide member in which said pin is slidably mounted, a driver for said pin also movably mounted in the guide member, and means limiting rearward movement of the driven in the guide member to retain the driver wholly in the guide member at all times.

3. Knock-out mechanism for a headed workpiece comprising a knock-out pin, a guide member in which said pin is slidably mounted, a driver for said pin also movably mounted in the guide member, and said driver being, at all times, confined in said guide member throughout its length.

4. Knock-out mechanism for a headed workpiece comprising a knock-out pin, a guide member in which said pin is slidably mounted, a driver for said pin also movably mounted in the guide member, and means limiting the movement of said driver to retain both ends thereof within the guide member throughout the movement of the driver.

5. Knock-out mechanism for a headed workpiece comprising a guide sleeve, a knock-out pin and a driver, said sleeve having a bore to receive said pin, and a slot extending laterally therethrough to receive said driver, said slot intersecting said bore and being longer than the corresponding dimension of the driver, and said driver projecting from the sleeve at the side thereof for engagement with an actuating member.

6. Knock-out mechanism for a headed workpiece comprising a guide sleeve, a knock-out pin and a driver, said sleeve having a bore to receive said pin, and a slot extending laterally entirely therethrough to receive said driver, said slot intersecting said bore and being longer than the corresponding dimension of the driver, and said driver projecting laterally from the sleeve at both sides thereof for engagement with an actuating member.

7. In a heading machine or the like a die, a suitably supported bushing having an opening in line with the die opening, a guide sleeve supported in the bushing opening and being spaced from the wall thereof, a knock-out pin slidably supported in said sleeve, a driver slidably supported in said sleeve to engage and move said knock-out pin, said driver projecting into the space between the sleeve and bushing, and means to engage a projecting portion of said driver to actuate the same.

8. In a heading machine or the like a die, a suitably supported bushing having an opening in line with the die opening, a guide sleeve supported in the bushing opening and being spaced from the wall thereof, a knock-out pin slidably supported in said sleeve, a driver slidably supported in said sleeve to engage and move said knock-out pin, said driver projecting into the space between the sleeve and bushing, a knock-out rod having its forward end projecting into the bushing and said rod having a recess in said end to receive said sleeve whereby it may engage the projecting portion of said driver between the ends of the sleeve.

9. In a heading machine or the like a die, a suitably supported bushing having an opening in line with the die opening, a guide sleeve supported in the bushing opening and being spaced from the wall thereof, a knock-out pin slidably supported in said sleeve, a driver slidably supported in said sleeve to engage and move said knock-out pin, said driver projecting into the space between the sleeve and bushing, a knock-out rod having its forward end projecting into the bushing and having a recess in said member to receive and telescope upon said sleeve and engage the projecting portion of, and actuate, said driver.

10. In a heading machine or the like a die, a suitably supported bushing having an opening in line with the die opening, a guide sleeve supported in the bushing opening and being spaced from the wall thereof, a knock-out pin slidably supported in said sleeve, a driver slidably supported in said sleeve to engage and move said knock-out pin, said driver projecting into the space between the sleeve and bushing, and said driver being confined within said sleeve throughout its length at all times.

11. In a heading machine or the like, a die, a suitably supported bushing having an opening in line with the die opening, a guide sleeve supported in the bushing and spaced from the wall thereof, a knock-out pin guided in said sleeve, a knock-out rod to actuate said pin, and said rod having a portion at its forward end to embrace and support said sleeve.

12. In a heading machine or the like, a die, a suitably supported bushing having an opening in line with the die opening, a guide sleeve supported in the bushing and spaced from the wall thereof, a knock-out pin guided in said sleeve, a knock-out rod to actuate said pin, and the forward portion of said rod projecting into the bushing opening and having a recess to telescopically receive said sleeve whereby the rear end of the latter is supported by said rod.

13. In a heading machine or the like, a die, a suitably supported bushing having an opening in line with the die opening, a guide sleeve supported in the bushing and spaced from the wall thereof, a knock-out pin guided in said sleeve, a knock-out rod to actuate said pin, and said rod having a recess in its forward end in which the rear end of said sleeve is received when the rod is advanced, and the wall of said rod surrounding the recess fitting snugly between the sleeve and the wall of the bushing to support said sleeve.

14. In a heading machine or the like, a die, a suitably supported bushing having an opening in line with the die opening, a guide sleeve supported in the bushing and spaced from the wall thereof, a knock-out pin guided in said sleeve, a knock-out rod to actuate said pin, and said rod having a portion at its forward end adapted to enter the space between the sleeve and the wall of the bushing when the rod is advanced to support the rear end of the sleeve.

RICHARD LESTER WILCOX.